US 6,690,949 B1

(12) United States Patent
Shamlou et al.

(10) Patent No.: US 6,690,949 B1
(45) Date of Patent: Feb. 10, 2004

(54) SYSTEM AND PROCESS FOR SUPPORTING MULTIPLE WIRELESS STANDARDS WITH A SINGLE CIRCUIT ARCHITECTURE

(75) Inventors: Danny Shamlou, Laguna Niguel, CA (US); Guangming Yin, Foothill Ranch, CA (US); Ricke Waylan Clark, Irvine, CA (US); Paul A. Underbrink, Lake Forest, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/410,136

(22) Filed: Sep. 30, 1999

(51) Int. Cl.[7] ................................................. H04B 1/38
(52) U.S. Cl. ..................... 455/557; 455/552.1; 455/315; 455/334; 710/64
(58) Field of Search .................... 455/558, 575.1–575.7, 455/90.3, 550.1, 414, 552.1, 572, 280, 343, 344, 347, 348, 349, 557, 334, 315; 341/143; 710/69, 62, 64, 301, 302, 314

(56) References Cited

U.S. PATENT DOCUMENTS

| | | | | |
|---|---|---|---|---|
| 5,243,345 A | * | 9/1993 | Naus et al. .................. 341/143 |
| 5,335,276 A | * | 8/1994 | Thompson et al. ......... 380/266 |
| 5,369,403 A | * | 11/1994 | Temes et al. ................ 341/143 |
| 5,408,235 A | * | 4/1995 | Doyle et al. ................. 341/143 |
| 5,522,089 A | * | 5/1996 | Kikinis et al. ................. 710/73 |
| 5,742,246 A | * | 4/1998 | Kuo et al. ................... 341/143 |
| 5,752,082 A | * | 5/1998 | Staples ......................... 710/62 |
| 5,760,722 A | * | 6/1998 | Harris et al. ................ 341/143 |
| 5,809,432 A | * | 9/1998 | Yamashita .................. 455/575 |
| 5,894,597 A | * | 4/1999 | Schwartz et al. ........... 455/558 |
| 5,924,044 A | * | 7/1999 | Vannatta et al. ............ 455/556 |
| 5,963,872 A | * | 10/1999 | Stein ........................... 455/557 |
| 6,091,967 A | * | 7/2000 | Kruys et al. ................ 455/557 |

OTHER PUBLICATIONS

Tetsu Sakata, Kazuhiko Seki, Shuji Kubota and Shuzo Kato, *π/4-shift OPSK Digital Modulator LSIC for Personal Communication Terminals*, NTT Radio Communication Systems Laboratories, PIMRC '94, © IEEE, pp. 472–475.

* cited by examiner

*Primary Examiner*—Vivian Chin
*Assistant Examiner*—Charles Craver
(74) *Attorney, Agent, or Firm*—Weide & Miller, Ltd.

(57) ABSTRACT

A communication system for the wireless transmission of information through a single antenna is disclosed. The communication system comprises a handset and one or more modules capable of being coupled to the handset. The handset processes baseband information signals being received and transmitted, and transmits and receives radio frequency (RF) information signals through its antenna. Each module is removably couplable to the handset for converting baseband information signals into RF information signals for transmission, and for converting received RF information signals into baseband information signals. Each removably couplable module is optimized to enable wireless communication in accordance with at least one communication standard when coupled to the handset. By coupling the appropriate module with the handset, wireless communication in a number of geographic locations may be achieved.

8 Claims, 5 Drawing Sheets

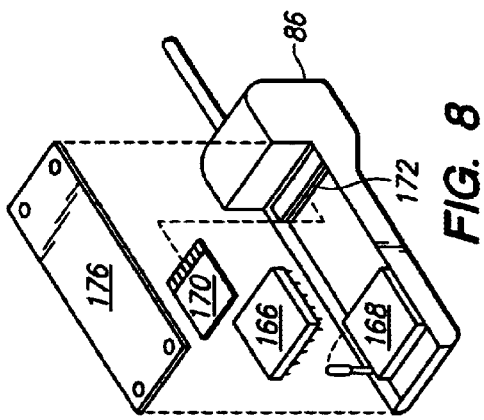
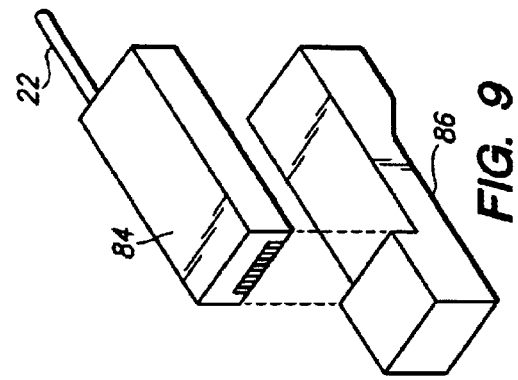
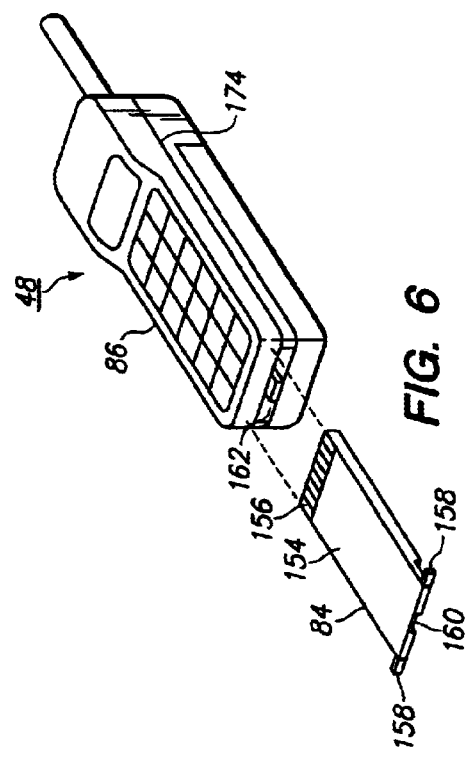
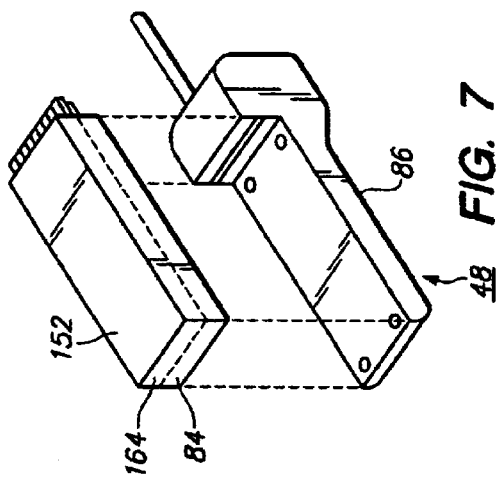

SYSTEM AND PROCESS FOR SUPPORTING MULTIPLE WIRELESS STANDARDS WITH A SINGLE CIRCUIT ARCHITECTURE

BACKGROUND OF THE INVENTION

1. Field of the Invention

The present invention relates, generally, to communication systems and processes which use radio frequency (RF) transmitters and receivers (transceivers), and, in particular embodiments, to systems and processes for communication transceivers employing replaceable modules to minimize size, weight, complexity, power consumption, and cost.

2. Description of Related Art

It has become increasingly important to minimize the size, weight, complexity, power consumption, and cost of various electronic devices, especially personal communication devices such as cellular telephones, personal pagers, cordless telephones, and the like. One way to minimize such characteristics is to minimize the number of components and functions required in the electronic device, or to perform multiple functions using the same components. However, personal communication devices such as cellular telephones often utilize complex circuitry with a number of power-inefficient components for performing multiple functions. This is especially true in modern cellular communications, where several different communication standards are employed worldwide, and cellular telephones with the flexibility to operate under multiple communications standards are highly desirable from a consumer and manufacturing perspective.

For example, the Global System for Mobile (GSM) communication standard is a world-wide mode of digital cellular communication operating over three different frequency bands. GSM-900 operates in the 900 MHz frequency band and is currently used in Europe and Asia. DCS is another digital cellular standard based on GSM technology, operating in the 1800 MHz frequency band and also currently used in Europe and Asia. The United States uses PCS, a third digital cellular standard similar to DCS, but operating in the 1900 MHz band. GSM is currently used in approximately 154 countries, including the geographic areas of North Africa, India, China, Europe, the Middle East, and Taiwan.

However, GSM is not the only mode of cellular communication. CDMA is another mode of digital cellular communication operating in either the 900 or 1900 MHz band. CDMA is one of the most widely used modes of cellular communication in the United States, and is the most widely used mode of cellular communication in Korea. CDMA is also being used in China, India, and Taiwan. It should be noted that other communication standards also exist around the world.

With improved voice and data communications and political climates continuing to expand the world market, a "world telephone" capable of operating in many different countries is of interest to international business and recreational travelers. Multi-mode, multi-band cellular telephones with shared functionality and an optimized architecture capable of operating under all of these standards afford consumers widespread applicability and allow manufacturers to benefit from the cost-efficiency of a common design.

However, multi-mode, multi-band cellular telephones present a number of design challenges. Conventional single-band transmitters typically require two separate frequencies, a fixed intermediate frequency (IF) for modulation and a tunable RF for upconversion. Conventional single-band receivers also typically require two separate frequencies, a tunable RF for downconversion and a fixed IF for demodulation. Thus, a single-band cellular telephone may require as many as four different frequency sources. Multi-band and multi-mode cellular telephones exacerbate the problem because the modulation, upconversion, downconversion, and demodulation processes for each band and mode may operate at different frequencies and amplitudes. Furthermore, the frequencies and amplitudes employed by each band and mode may require different filters and amplifiers for the transmit and receive function of each band. The design challenge of producing cellular telephones of minimal size, weight, complexity, power consumption, and cost is thus compounded by multi-mode, multi-band cellular telephones.

A current trend in attempting to solve this design challenge is the concept of a "software radio," which focuses on utilizing as much digital processing as possible. By utilizing digital technology, multi-mode, multi-band transceiver functions can be implemented more generically, with fewer analog components and fewer bulky filters. A problem with digital technology, however, is that a higher resolution ADC (Analog to Digital Converter) may be required. The digital components may be more inefficient than functionally comparable analog components, resulting in greater power consumption. Greater power consumption, in turn, may require a larger battery, negating any size and weight saving achieved by the use of digital technology.

SUMMARY OF THE DISCLOSURE

Therefore, it is an advantage of embodiments of the present invention to provide a system and process for supporting multiple wireless standards with a single circuit architecture to minimize size, weight, complexity, power consumption, and cost.

It is a further advantage of embodiments of the present invention to provide a system and process for supporting multiple wireless standards with a single circuit architecture capable of receiving a replaceable module optimized for one or more communication standards to minimize size and power consumption.

These and other objects are accomplished according to a communication system for the wireless transmission of information through a single antenna. The communication system comprises a handset and one or more modules capable of being coupled to the handset. The handset processes baseband information signals being received and transmitted, and transmits and receives RF information signals through its antenna. Each module is removably couplable to the handset for converting baseband information signals into RF information signals for transmission, and for converting received RF information signals into baseband information signals. Each removably couplable module is optimized to enable wireless communication in accordance with at least one communication standard when coupled to the handset. By coupling the appropriate module with the handset, wireless communication in a number of geographic locations may be achieved.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 6 is a perspective view of a communication transceiver including a handset and replaceable module according to an alternative embodiment of the present invention.

FIG. 7 is a perspective view of a communication transceiver including a handset and a replaceable module incorporated into a battery pack according to an alternative embodiment of the present invention.

FIG. 8 is a perspective view of a handset with a cover removed to reveal replaceable modules according to an alternative embodiment of the present invention.

FIG. 9 is a perspective view of a communication transceiver including a handset and a replaceable module, the replaceable module including the antenna according to an alternative embodiment of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Cellular communication systems employ several different communication standards worldwide and utilize several different frequency bands. For example, the GSM communication standard operates over three different bands, 900 MHz, 1800 MHz, and 1900 MHz, while the CDMA communication standard operates over two different bands, 900 MHz and 1900 MHz. Cellular telephones with the flexibility to operate under multiple communications standards afford consumers widespread applicability. However, the number of different communication standards and frequency bands makes it impractical for a cellular telephone to incorporate all the electronics necessary to operate in all of these modes.

Embodiments of the present invention therefore relate to cellular communication transceivers employing a common handset capable of receiving a replaceable module containing circuitry optimized for one or more communication standards. By coupling only those electronics needed for a particular communication standard into the common handset, unnecessary or inefficient electronics are minimized or eliminated.

It should be noted, however, that transceivers according to embodiments of the present invention are not unique to cellular communications and may be employed in a variety of communications electronics, including wireless transmission systems as well as wired systems. Thus, embodiments of the invention described herein may involve various forms of communications systems. However, for purposes of simplifying the present disclosure, preferred embodiments of the present invention are described herein in relation to personal wireless communications systems, including, but not limited to digital mobile telephones, digital cordless telephones, digital pagers, combinations thereof, and the like. Such personal communications systems typically include one or more portable or remotely located receiver and/or transmitter units.

Figures 1, 2:
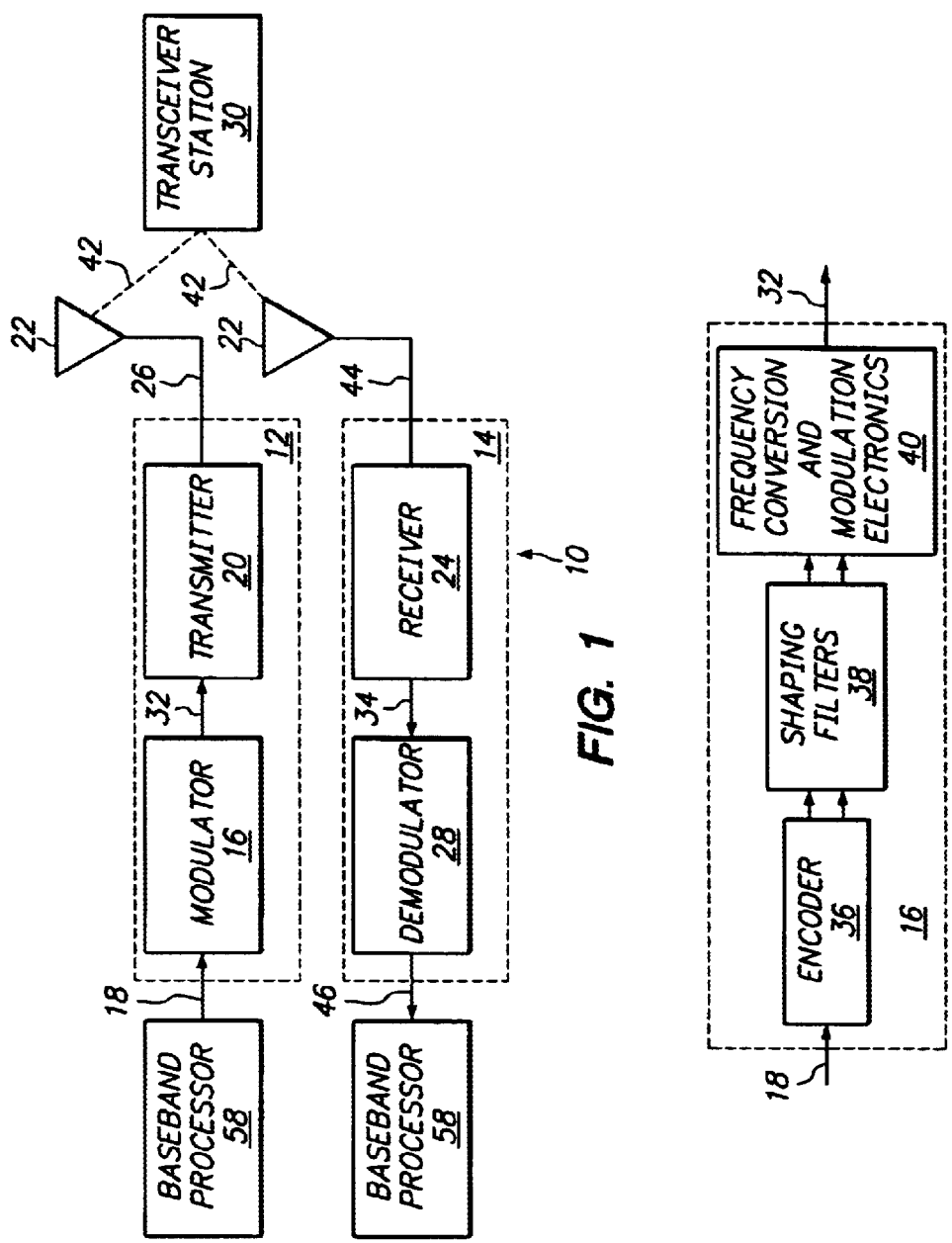
FIG. 1 is block diagram representation of a system environment according to an example embodiment of the present invention.
FIG. 2 is a more detailed block diagram representation of the modulator in the system of FIG. 1.

A generalized representation of a communication system 10 according to an embodiment of the present invention is shown in FIG. 1, wherein communication system 10 includes a transmitting unit 12 and a receiving unit 14, coupled for communication over a communication channel 42. Transmitting unit 12 includes a modulator 16 coupled to receive a digital transmit baseband information signal 18 from a baseband processor 58. In one representative embodiment, the baseband processor 58 may include, for example, a microphone for converting sound waves into electronic signals and sampling and analog-to-digital converter electronics for sampling and converting the electronic signals into digital signals representative of the sound waves. In other embodiments, the signal source may include any suitable device for producing digital data signals for communication over channel 42, such as, but not limited to, a keyboard, a digital voice encoder, a mouse or other user input device, a sensor, monitor or testing apparatus, or the like.

Modulator 16 provides a second transmit IF information signal 32 as an output to a transmitter 20. A transmit RF information signal 26 is produced by transmitter 20 for transmission from an antenna 22. Receiving unit 14 includes a receiver 24 coupled to antenna 22 to process a receive RF information signal 44. Receiver 24 provides a modulated second receive IF information signal 34 to a demodulator 28, which demodulates second receive IF information signal 34 and generates digital receive baseband information signals 46.

Demodulated digital receive baseband information signals 46 from demodulator 28 are provided to baseband processor 58, which may include signal processing electronics, sound producing electronics or the like, depending upon the nature of use of receiving unit 12. Transmitting and receiving units 12 and 14 include further components, power supplies, and the like, well known in the art for effecting transmission and reception of signals and for carrying out other functions specific to the nature and application of use of communication system 10.

In preferred communication system embodiments, such as cellular telephone embodiments or cordless telephone embodiments, a transceiver 48 includes both transmitting unit 12 and receiving unit 14 as shown in FIG. 1. In one system embodiment, multiple transceivers 48 transmit and receive signals directly therebetween. In other system embodiments, transceivers 48 communicate through one or more additional transceiver stations 30 (such as repeaters, base or cell stations, or the like).

As illustrated in the modulator 16 of FIG. 2, in digital cellular telephone or cordless telephone system embodiments digital transmit baseband information signal 18 provides sampled voice (or sound) signals in the form of baseband I and Q channel signals to an encoder 36. In one preferred cellular telephone embodiment, encoder 36 comprises a Phase Shift Key encoder, such as, but not limited to, a π/4-shift Quadrature Phase Shift Key mapper with differential encoder (π/4 DQPSK), and shaping filters 38 comprise pulse shaping filters for smoothing the encoder output signal. An example of a π/4 DQPSK and pulse shaping electronics is described in the article titled: "π/4-shift QPSK Digital Modulator LSIC for Personal Communication Terminals," by Tetsu Sakata, Kazuhiko Seki, Shuji Kubota and Shuzo Kato, Proc. 5th IEEE International Symposium on Personal, Indoor and Mobile Radio Communications, 1994 (incorporated herein by reference). Other embodiments may employ other suitable encoding schemes, including but not limited to Amplitude Shift Keying and Frequency Shift Keying schemes.

I and Q outputs of the encoder pass through shaping filters 38 and then to frequency conversion and modulation electronics 40, the output of which comprises a second transmit IF information signal 32. Second transmit IF information signal 32 is then fed to transmitter 20 as shown in FIG. 1, which provides the transmit RF information signal 26 to the antenna 22 for transmission.

Figure 3:
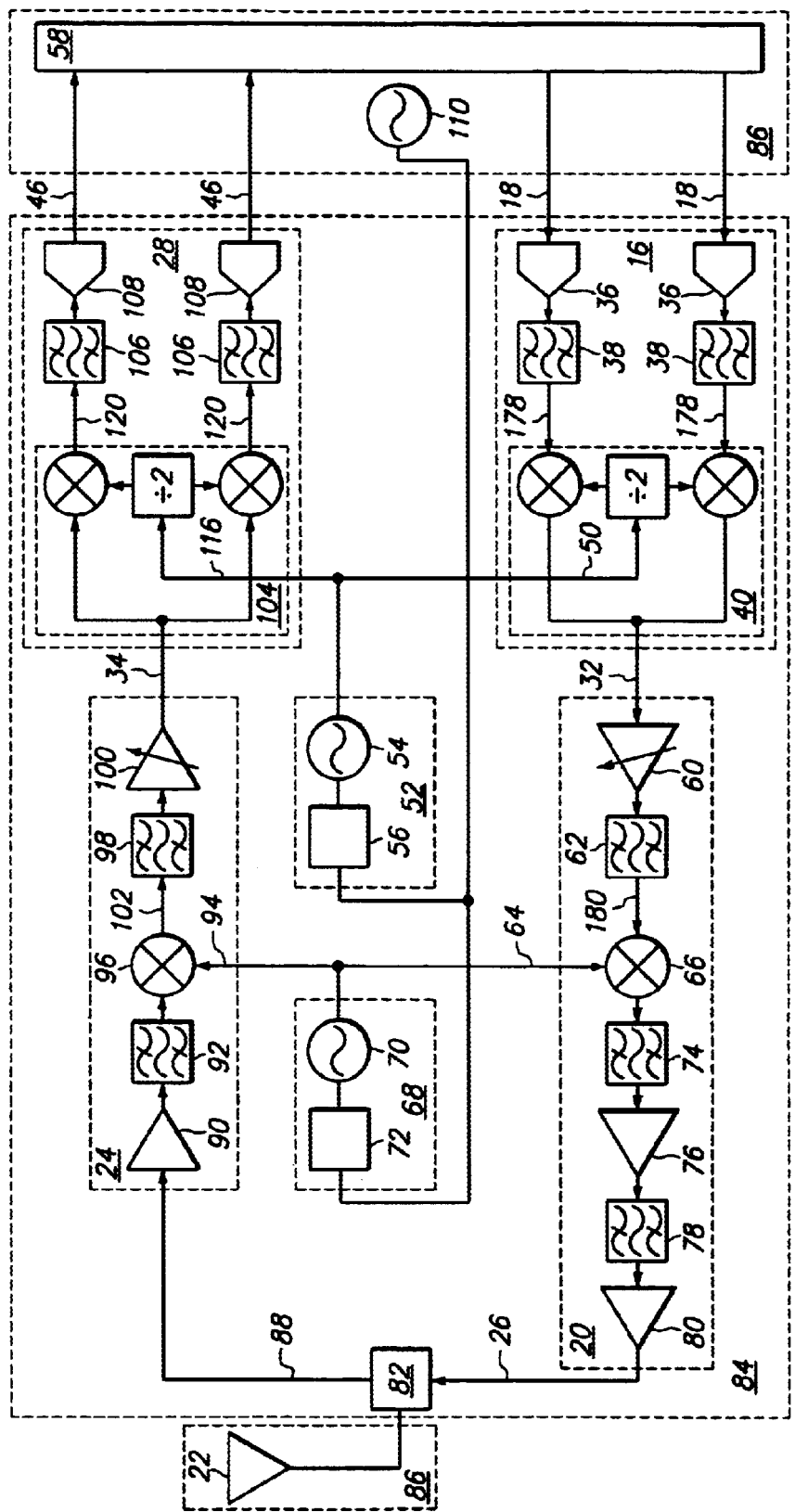
FIG. 3 is a block diagram representation of a communication transceiver including a handset and replaceable module according to an embodiment of the present invention.

A communication transceiver 48 according to a preferred embodiment of the present invention is illustrated in FIG. 3. Transceiver 48 includes a handset 86 and a replaceable module 84. Included in handset 86 are baseband processor 58 and antenna 22 as described above with reference to FIG. 1, although it should be noted that in alternative embodiments, antenna 22 may be located within replaceable module 84. In the transmit path of replaceable module 84, digital transmit baseband information signals 18 provides sampled voice (or sound) signals in the form of baseband I and Q channel signals to an encoder 36. Encoder 36 converts digital transmit baseband information signals 18 to analog signals, which are then filtered by shaping filters 38 to produce analog transmit baseband information signals 178. Frequency conversion and modulation electronics 40 modulate a transmit IF local oscillator (LO) 50 with analog transmit baseband information signals 178 to produce a second transmit IF information signal 32 at an IF carrier frequency. Transmit IF LO 50 is generated by an IF LO frequency generator 52 comprising an IF LO frequency source 54 phase-locked to reference source 110 within handset 86 by transmit IF LO loop electronics 56. In preferred embodiments of the present invention, IF LO frequency source 54 is a voltage controlled oscillator (VCO). However, in alternative embodiments of the present invention, IF LO frequency source 54 may be any adjustable frequency source.

Second transmit IF information signal 32 is then amplified by a transmit IF variable gain amplifier (VGA) 60 within transmitter 20. Transmit IF VGA 60 provides power control by adjusting its gain based on commands received from the base station. It should be noted that although power control is critical in CDMA, a variable gain amplifier is not required for GSM, and thus in alternative embodiments of the invention transmit IF VGA 60 need not have variable gain.

The output of transmit IF VGA 60 is filtered by transmit IF filter 62, which filters out noise including noise generated by the transmit IF VGA 60 in the receive band to meet receive band noise floor requirements. Transmit IF filter 62 has a center frequency approximately equivalent to the IF carrier frequency and a bandwidth sufficient to pass the modulated and amplified transmit IF information signal with minimal distortion. The output of transmit IF filter 62 is first transmit IF information signal 180, which is then mixed with a transmit RF LO 64 in transmit upconverter mixer 66. In preferred embodiments, transmit upconverter mixer 66 generates the difference between the output of transmit IF filter 62 and transmit RF LO 64. In alternative embodiments of the present invention, transmit upconverter mixer 66 may be replaced by a translation loop.

In embodiments of the present invention, transmit RF LO 64 is generated by a RF LO frequency generator 68 containing a RF LO frequency source 70 phase-locked to reference source 110 within handset 84 by RF LO loop electronics 72. In preferred embodiments, RF LO frequency source 70 comprises a VCO. However, in alternative embodiments, RF LO frequency source 70 may be any adjustable frequency source.

The output of transmit upconverter mixer 66 is filtered by first transmit RF filter 74 which has a passband encompassing the transmit band of the particular communication standard of replaceable module 84 to remove spurious frequencies generated by transmit upconverter mixer 66. The output of first transmit RF filter 74 is then amplified by transmit RF driver amplifier 76, which amplifies the low level output of first transmit RF filter 74. The output of transmit RF driver amplifier 76 is then filtered by second transmit RF filter 78, which has a passband encompassing the transmit band of the particular communication standard of replaceable module 84 to filter out noise in the receive band including noise generated by transmit RF driver amplifier 76. The output of second transmit RF filter 78 is then amplified by transmit RF power amplifier 80 to generate transmit RF information signal 26 at a level sufficient to meet output power requirements at antenna 22. Transmit RF information signal 26 is then filtered by duplexer 82, which has a transmit passband encompassing the transmit band of the particular communication standard of replaceable module 84 to filter out-of-band noise generated by transmit RF power amplifier 80. The output of duplexer 82 is then transmitted by antenna 22. In alternative embodiments of the present invention, duplexer 82 may be replaced by an RF switch or a resistor combiner.

In the receive path, signals from antenna 22 are filtered by duplexer 82 having a receive passband encompassing the receive band of the particular communication standard of replaceable module 84 for passing only receive band signals. The output of duplexer 82 is receive RF information signal 88, which is amplified by a receive RF low noise amplifier (LNA) 90. The output of receive RF LNA 90 is then filtered by a receive RF image reject filter 92. Receive RF image reject filter 92 is a bandpass filter with a passband encompassing the receive band of the particular communication standard of replaceable module 84 to filter out image noise present at the output of the receive RF LNA 90 capable of mixing with receive RF LO 94 in receive downconverter mixer 96 and producing unwanted signals in the IF band. In preferred embodiments of the present invention, receive RF LO 94 is generated by RF LO frequency generator 68, and receive downconverter mixer 96 generates the difference between the output of receive RF image reject filter 92 and receive RF LO 94, designated herein as first receive IF information signal 102.

First receive IF information signal 102 then passes through a receive IF filter 98 with a bandwidth encompassing the modulation bandwidth of the particular communication standard of replaceable module 84 to remove spurious frequencies generated by receive downconverter mixer 96. The output of receive IF filter 98 is then fed into receive IF VGA 100. Receive IF VGA 100 provides variable gain control by adjusting its gain based on commands received from the base station. The output of receive IF VGA 100 is second receive IF information signal 34.

Second receive IF information signal 34 is mixed with receive IF LO 116 and demodulated by frequency conversion and demodulation electronics 104 within demodulator 28. In embodiments of the present invention, receive IF LO 116 is generated by IF LO frequency generator 52.

Frequency conversion and demodulation electronics 104 produce analog receive baseband information signals 120, characterized herein as either DC or a "near DC" IF (for example, a center frequency of about 1 MHz). Analog receive baseband information signals 120 are filtered by baseband filters 106 to remove any spurious frequencies. Baseband filters 106 have a bandwidth sufficient to accommodate the modulation bandwidth of the particular communication standard of replaceable module 84, and may be low pass filters if the receive baseband signals are DC, or bandpass filters if the receive baseband signals are near DC. The filtered and demodulated receive baseband signals are then processed by quantizers 108, which generate digital receive baseband information signals 46. In preferred embodiments, quantizers 108 are analog-to-digital converters (ADCs).

Figure 4:
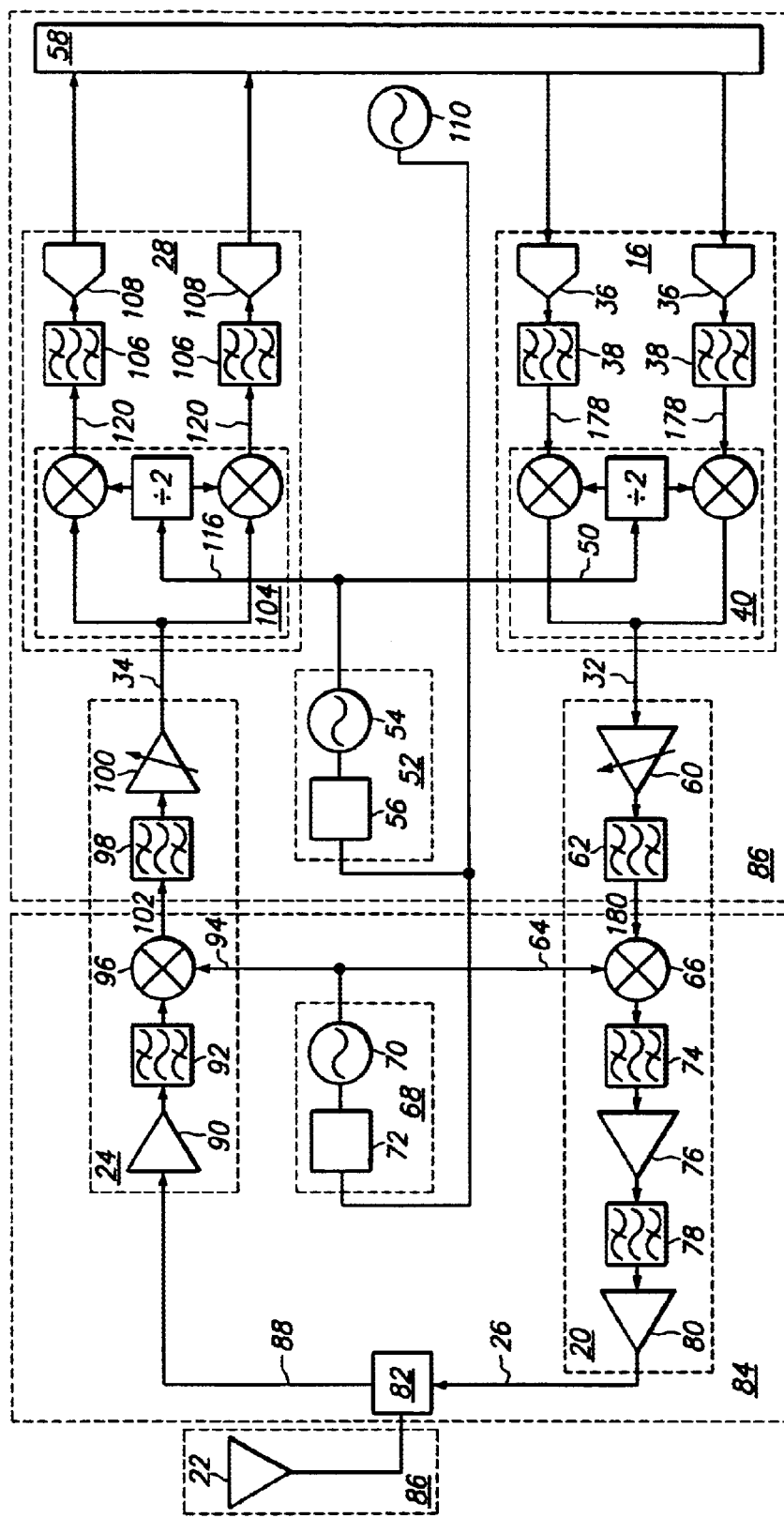
FIG. 4 is a block diagram representation of a communication transceiver including a handset and replaceable module according to an alternative embodiment of the present invention.

It should be noted that the replaceable module 84 of FIG. 3 is only illustrative of the functional blocks that might reside in the module. For example, in alternative embodiments of the present invention illustrated in FIG. 4, handset 86 may incorporate one or more of the following functional blocks: modulator 16, demodulator 28, IF LO frequency generator 52, receive IF VGA 100, receive IF filter 98, transmit IF VGA 60, and transmit IF filter 62. In addition, although not shown in FIG. 5, antenna 22 may be included in replaceable module 84 instead of handset 86.

Figure 5:
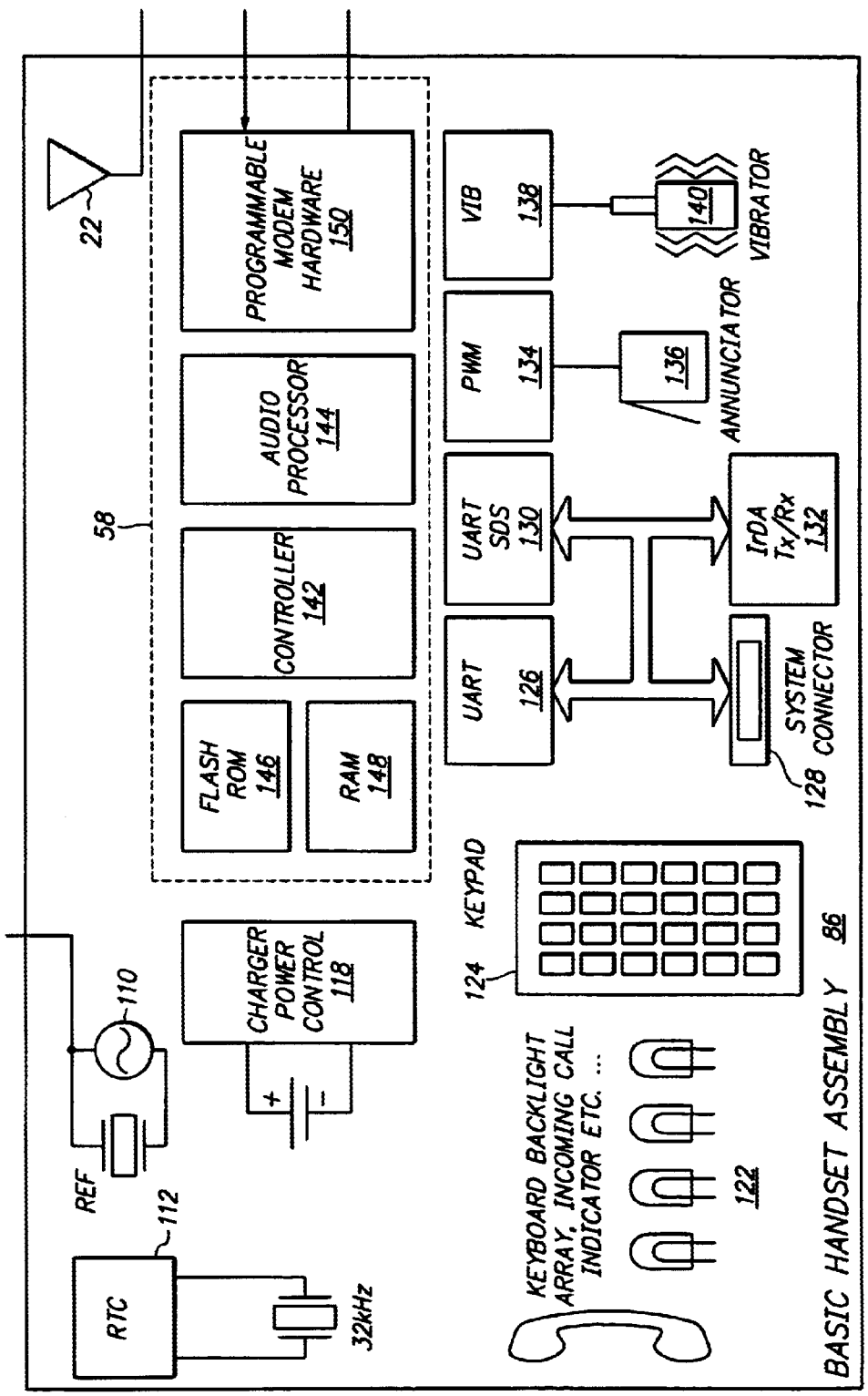
FIG. 5 is a block diagram representation of a handset according to an embodiment of the present invention.

FIG. 5 is a more detailed block diagram of handset 86 according to a preferred embodiment of the present invention. In addition to baseband processor 58, reference source 110, and antenna 22 as shown in FIG. 3, handset 86 further includes real-time clock (RTC) 112 for maintaining the time of day and date, battery charger power control 118, keyboard backlight array 122, keypad 124, Universal Asynchronous Receiver/Transmitter (UART) 126, system connector 128, UART serial data services (SDS) interface 130, IrDA Tx/Rx infrared transceiver 132, Pulsed Width Modulator (PWM) 134, annunciator 136, vibrator electronics (VIB) 138, and vibrator 140, all well known in the art for effecting transmission and reception of signals and for carrying out other functions specific to the nature and application of use of transceiver 48. Baseband processor 58 further includes a controller 142, audio processor 144, flash Read Only Memory (ROM) 146, Random Access Memory (RAM) 148, and programmable modulator/demodulator (modem) hardware 150.

For each communication standard, software is required to properly perform baseband processing. In preferred embodiments of the present invention, the software for each communication standard is preprogrammed into ROM 146. Through a serial control interface to replaceable module 84, a separate portion of the software responsible for start-up processing polls replaceable module 84 upon power-up of transceiver 48, and receives back a data string identifying the communication standard associated with that module. Based on that identifying data string, the proper software is then accessed in ROM 146 during the operation of transceiver 48.

In alternative embodiments of the present invention, the software for each communication standard is preprogrammed into nonvolatile memory (not shown in FIG. 5) resident in module 84. Through a serial control interface to replaceable module 84, software responsible for start-up processing within ROM 146 initiates a serial transfer of the software in module 84 into RAM 148 upon power-up of transceiver 48. The software within RAM 148 is then accessed during the operation of transceiver 48.

In a further alternative embodiment of the present invention, the software for each communication standard is preprogrammed into nonvolatile memory (not shown in FIG. 5) resident in module 84. Through a parallel data interface to replaceable module 84, software within the nonvolatile memory is directly accessed during the operation of transceiver 48.

In still further alternative embodiments of the present invention, the software for each communication standard is initially not located in either handset 86 or replaceable module 84, but is downloaded into transceiver 48 from an external source. In one such embodiment, transceiver 48 is coupled to a digital device such as a personal computer via system connector 128 or through an infrared data interface, and a download sequence is initiated to transfer the appropriate software from the digital device to RAM 148 within handset 86. The digital device may itself have received the appropriate software from a CD-ROM, magnetic media, the internet, or the like.

In another such alternative embodiment, a minimal amount of software is preprogrammed into nonvolatile memory in replaceable module 84. This minimal set of software corresponds to the communication standard of the particular module 84, and provides transceiver 48 with minimal capabilities sufficient to establish communications with the network at that standard. Once the communication link is established, the remainder of the software is downloaded from the network into RAM 148 to provide transceiver 48 with full functionality.

In preferred embodiments of the invention, a portion of RAM 148 is reserved for storing user-programmed phone numbers, games, and the like into handset 86. With this capability, handset 86 can be configured for use with any number of communication standards simply by coupling in the appropriate module 84 while avoiding the need to reprogram this custom information.

In preferred embodiments of the invention illustrated in FIG. 6, replaceable module 84 is a plug-in unit with a housing 154 protecting sensitive circuitry within. Replaceable module 84 is shaped to be insertable into card slot 162 by the user. Along one or more edges of replaceable module 84 are contacts 156 for engagement with mating connectors (not shown in FIG. 6) within handset 86. Also along one or more edges of replaceable module 84 are disengagement tabs 158 for removing replaceable module 84 from handset 86. Housing 154 may contain one or more guide slots or ridges 160 for aligning replaceable module 84 into card slot 162, and for ensuring that replaceable module 84 is inserted with the proper orientation. In further alternative embodiments of the present invention illustrated in FIG. 7, replaceable module 84 is located in the same housing 152 as a replaceable battery pack 164. In another alternative embodiment illustrated in FIG. 9, antenna 22 is included as part of the replaceable module 84. The replaceable module 84 of FIG. 9 may or may not include battery pack 164.

While FIGS. 6, 7, and 9 illustrate embodiments in which replaceable module 84 is user-replaceable without the need for removal of any part of the housing of handset 86, in still further alternative embodiments illustrated in FIG. 8, module 84 is replaceable only by removing a cover 176 of handset 86. In FIG. 8, replaceable module 84 may comprise a multi-chip module (MCM) 166 insertable into a zero-insertion force (ZIF) socket 168, or a printed circuit board (PCB) 170 insertable into a spring-force connector 172.

A number of business approaches may be employed by wireless communications providers to facilitate the use of transceiver 48. For example, a user may be required to purchase replaceable modules 84 and bring the appropriate replaceable module to a particular region in order to establish a communication link. Knowledge of applicable communication standards in a particular region may be obtained from maps, or by calling a communications provider. If the particular communication standard in the region is unknown, a user must plug in one replaceable module at a time until the appropriate module is found. Alternatively, replaceable modules 84 can be rented from regional offices of the local communications provider. A user can then simply visit the regional office and rent the module appropriate for that area.

When using transceiver 48 in networks outside the user's home communication area, billing information must be routed back to the user's account with the home communications provider. In one example, a remote billing account is established in advance of visiting the remote location by contacting either the user's home communications provider, who will then establish an account with the remote communications provider, or by contacting the remote communications provider directly. In addition, transceivers may be electronically registered for use in remote areas in advance of visiting the remote location by downloading (from the home network) account numbers, personal identification numbers, and other electronic keys that will allow transceiver 48 to establish communications in the remote location.

Alternatively, a remote billing account is not established in advance of visiting the remote location. Instead, the user accesses the remote network with an unregistered phone and enters a credit card or account number for billing purposes. In further alternative embodiments illustrated in FIG. 6, a card reader 174 employed within handset 86 is used to read credit or account cards or bar-code information.

Therefore, according to the foregoing description, preferred embodiments of the present invention provide a system and process for supporting multiple wireless standards with a single circuit architecture. In preferred embodiments, the single circuit architecture is capable of receiving a replaceable module optimized for one or more communication standards to minimize size, weight, complexity, power consumption, and cost.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A communication system for communicating at least one transmit first information signal and at least one receive first information signal through a common antenna, the communication system comprising:

a handset for processing receive baseband information signals and generating transmit baseband information signals;

a first number of modules, each module removably couplable to the handset for converting the transmit baseband information signals into the at least one transmit first information signal, and for converting the at least one receive first information signal into receive baseband information signals;

wherein each removably couplable module enables communication in accordance with at least one communication standard when coupled to the handset;

wherein the handset comprises a modulator for modulating the transmit baseband information signals with a transmit IF LO to generate a second transmit IF information signal, and a demodulator for demodulating a second receive IF information signal with a receive IF LO to generate the receive baseband information signals; and wherein at least one module comprises a transmitter for upconverting the second transmit IF information signal to generate the at least one transmit first information signal, and a receiver for downconverting the at least one receive first information signal to generate the second receive IF information signal.

2. A communication system as recited in claim 1:

the handset further including an IF LO frequency generator for generating the transmit IF LO and the receive IF LO.

3. A communication system for communicating at least one transmit first information signal and at least one receive first information signal through a common antenna, the communication system comprising:

a handset for processing receive baseband information signals and generating transmit baseband information signals;

a first number of modules, each module removably couplable to the handset for converting the transmit baseband information signals into the at least one transmit first information signal, and for converting the at least one receive first information signal into receive baseband information signals;

wherein each removably couplable module enables communication in accordance with at least one communication standard when coupled to the handset; and wherein the handset comprises a transmit IF variable gain amplifier, transmit IF filter, and a modulator, coupled for amplifying, filtering, and modulating the transmit baseband information signals with a transmit IF LO to generate a first transmit IF information signal, and a receive IF filter, receive IF variable gain amplifier, and demodulator coupled for filtering, amplifying, and demodulating a first receive IF information signal with a receive IF LO to generate the receive baseband information signals; and wherein at least one module comprises a transmit upconverter mixer for upconverting the first transmit IF information signal to generate the at least one transmit first information signal, and a receive downconverter mixer for downconverting the at least one receive first information signal to generate the first receive IF information signal.

4. A process for communicating at least one transmit first information signal and at least one receive first information signal through a common antenna utilizing a common handset and any one of a first number of removably couplable modules, the process comprising:

locating within the common handset a baseband processor for processing receive baseband information signals and generating transmit baseband information signals within the handset;

locating within the handset a modulator for modulating the transmit baseband information signals with a transmit IF LO to generate a second transmit IF information signal, and a demodulator for demodulating a second receive IF information signal with a receive IF LO to generate the receive baseband information signals;

optimizing in accordance with at least one communication standard a modulator, transmitter, receiver, and demodulator co-located within each module for converting the transmit baseband information signals into the at least one transmit first information signal, and for converting the at least one receive first information signal into receive baseband information signals; and removably coupling any one of the first number of modules optimized for operating within at least one locally available wireless network to the handset to enable communication with the wireless network; and wherein at least one module comprises a transmitter for upconverting the second transmit IF information signal to generate the at least one transmit first information signal, and at least one module comprises a receiver for downconverting the at least one receive first information signal to generate the second receive IF information signal.

5. A process as recited in claim 4, further including the steps of:

reading an identifier within the coupled module which identifies the at least one communication standard associated with that module;

accessing instructions stored within the handset for performing baseband processing in accordance with the identified at least one communication standard; and performing baseband processing according to the instructions.

6. A process as recited in claim 4, further including the steps of:

transferring instructions stored in the coupled module into the handset, the instructions for processing data in accordance with the at least one communication standard associated with that coupled module; and performing baseband processing according to the instructions.

7. A process as recited in claim 4 further including the steps of:

accessing instructions stored in the coupled module for processing data in accordance with the at least one communication standard associated with the module; and performing baseband processing according to the instructions.

8. A process as recited in claim 4, further including the steps of:

transferring instructions from an outside source into the handset, the instructions for processing data in accordance with the at least one communication standard associated with the coupled module; and performing baseband processing according to the instructions.

* * * * *